(12) United States Patent
Chen et al.

(10) Patent No.: US 6,272,902 B1
(45) Date of Patent: *Aug. 14, 2001

(54) METHOD AND APPARATUS FOR OFF-LINE TESTING A POLISHING HEAD

(75) Inventors: Wen-Ten Chen, Chung-ho; Chung-Yang Lin, Hsing-chu; Fang-Lin Lu, Chung-ho; Kau-Po Yeh, Hsin-chu, all of (TW)

(73) Assignee: Taiwan Semiconductor Manufactoring Company, Ltd., Hsin Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/283,054

(22) Filed: Jan. 4, 1999

(51) Int. Cl.[7] .............................. G01N 3/02; B24B 29/00; B24B 47/00
(52) U.S. Cl. .............................. 73/37; 451/289; 451/388
(58) Field of Search ..................... 73/37, 40; 451/285, 451/287, 288, 5, 289, 388

(56) References Cited

U.S. PATENT DOCUMENTS

| | | | |
|---|---|---|---|
| 5,964,653 | * 10/1999 | Perlov et al. | 451/288 |
| 5,980,367 | * 11/1999 | Metcalf | 451/285 |
| 5,993,302 | * 11/1999 | Chen et al. | 451/285 |
| 6,012,964 | * 1/2000 | Arai et al. | 451/5 |
| 6,056,630 | * 5/2000 | Nanda et al. | 451/287 |
| 6,056,632 | * 5/2000 | Mitchel et al. | 451/288 |
| 6,080,050 | * 6/2000 | Chen et al. | 451/288 |
| 6,106,378 | * 8/2000 | Perlov et al. | 451/288 |
| 6,113,480 | * 9/2000 | Hu et al. | 451/289 |

* cited by examiner

Primary Examiner—Hezron Williams
Assistant Examiner—Jay L. Politzer
(74) Attorney, Agent, or Firm—Tung & Associates

(57) ABSTRACT

A method for off-line testing a polishing head used in a CMP polishing apparatus is disclosed. The method utilizes at least two sets of pressurizing/vacuuming/venting devices for the independent testing of at least two fluid chambers which may include a membrane chamber, a retaining ring chamber and an innertube chamber normally found in a CMP polishing head. The present invention further discloses an off-line testing apparatus for a chemical mechanical polishing head which includes at least two independent sets of pressurizing/vacuuming/venting devices for testing a CMP head that is equipped with at least two fluid chambers such as a membrane chamber, a retaining ring chamber and an innertube chamber. The method and apparatus can be used advantageously for testing a variety of defects in a CMP polishing head prior to the installation of the head into a CMP apparatus. The defects include leakage between the fluid chambers, loss of vacuum seal in the fluid chambers, and binding between the fluid chambers. A pressurizing source utilized may be a general nitrogen gas in a fabrication plant. The vacuum source may be factory vacuum.

20 Claims, 5 Drawing Sheets

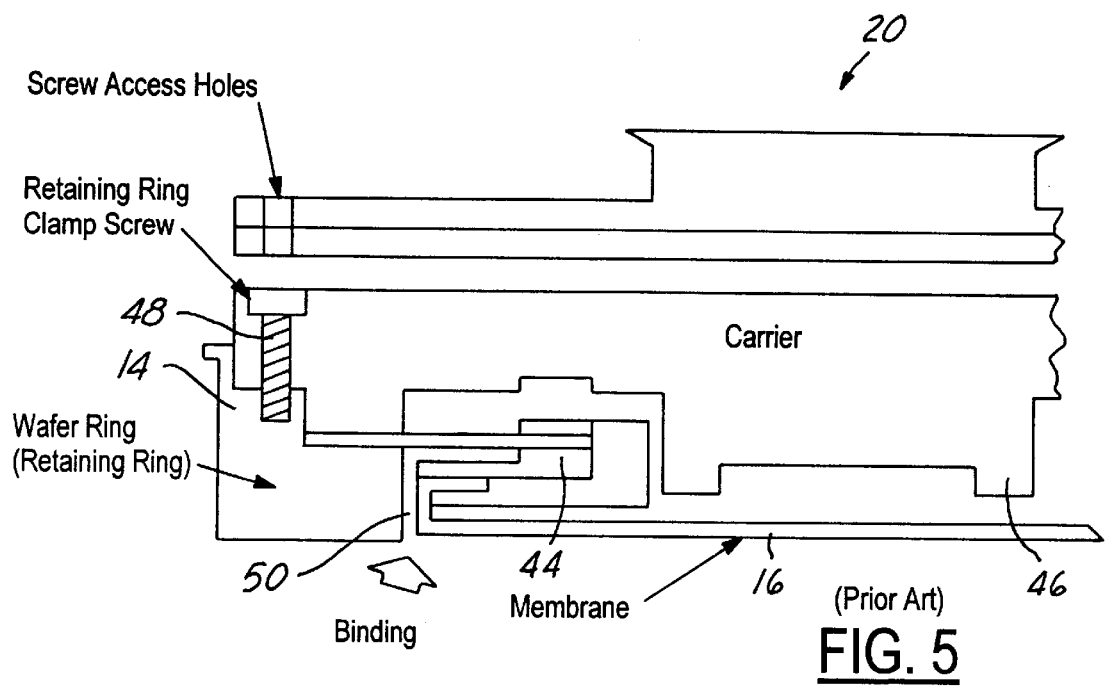
(Prior Art) FIG. 5
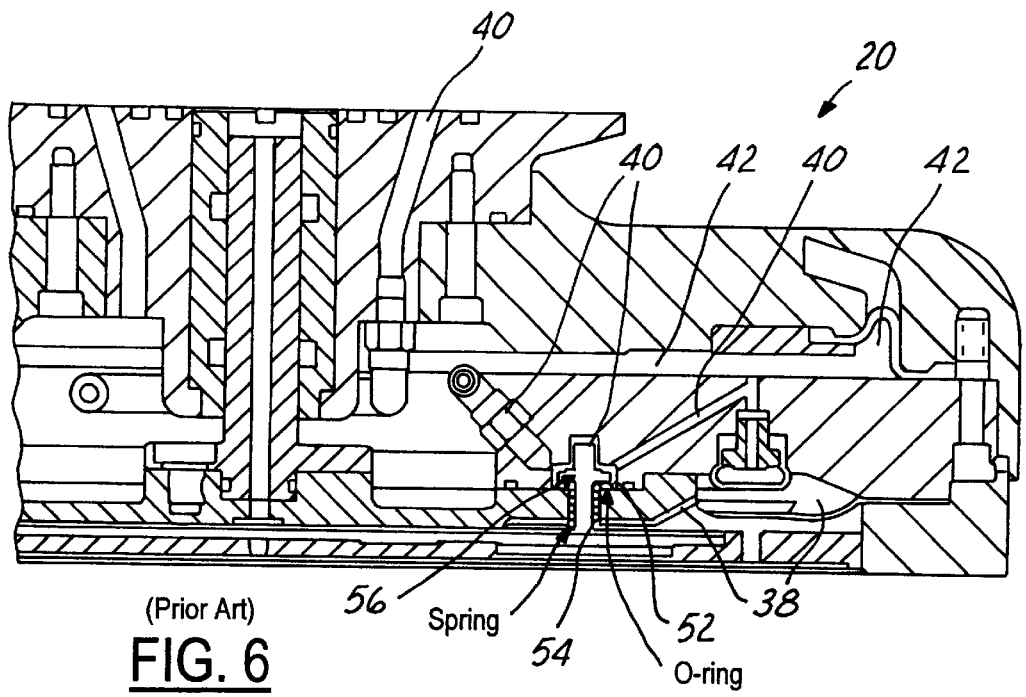
(Prior Art) FIG. 6

METHOD AND APPARATUS FOR OFF-LINE TESTING A POLISHING HEAD

FIELD OF THE INVENTION

The present invention generally relates to a method and an apparatus for testing a chemical mechanical polishing head and more particularly, relates to a method and an apparatus for testing a chemical mechanical polishing head that can be carried out off-line such that down time of the chemical mechanical polishing apparatus is not required.

BACKGROUND OF THE INVENTION

Apparatus for polishing thin, flat semiconductor wafers is well-known in the art. Such apparatus normally includes a polishing head which carries a membrane for engaging and forcing a semiconductor wafer against a wetted polishing surface, such as a polishing pad. Either the pad, or the polishing head is rotated and oscillates the wafer over the polishing surface. The polishing head is forced downwardly onto the polishing surface by a pressurized air system or, similar arrangement. The downward force pressing the polishing head against the polishing surface can be adjusted as desired. The polishing head is typically mounted on an elongated pivoting carrier arm, which can move the pressure head between several operative positions. In one operative position, the carrier arm positions a wafer mounted on the pressure head in contact with the polishing pad. In order to remove the wafer from contact with the polishing surface, the carrier arm is first pivoted upwardly to lift the pressure head and wafer from the polishing surface. The carrier arm is then pivoted laterally to move the pressure head and wafer carried by the pressure head to an auxiliary wafer processing station. The auxiliary processing station may include, for example, a station for cleaning the wafer and/or polishing head; a wafer unload station; or, a wafer load station.

More recently, chemical-mechanical polishing (CMP) apparatus has been employed in combination with a pneumatically actuated polishing head. CMP apparatus is used primarily for polishing the front face or device side of a semiconductor wafer during the fabrication of semiconductor devices on the wafer. A wafer is "planarized" or smoothed one or more times during a fabrication process in order for the top surface of the wafer to be as flat as possible. A wafer is polished by being placed on a carrier and pressed face down onto a polishing pad covered with a slurry of colloidal silica or alumina in de-ionized water.

A schematic of a typical CMP apparatus is shown in FIGS. 1A and 1B. The apparatus 10 for chemical mechanical polishing consists of a rotating wafer holder 14 that holds the wafer 10, the appropriate slurry 24, and a polishing pad 12 which is normally mounted to a rotating table 26 by adhesive means. The polishing pad 12 is applied to the wafer surface 22 at a specific pressure. The chemical mechanical polishing method can be used to provide a planar surface on dielectric layers, on deep and shallow trenches that are filled with polysilicon or oxide, and on various metal films. CMP polishing results from a combination of chemical and mechanical effects. A possible mechanism for the CMP process involves the formation of a chemically altered layer at the surface of the material being polished. The layer is mechanically removed from the underlying bulk material. An altered layer is then regrown on the surface while the process is repeated again. For instance, in metal polishing, a metal oxide may be formed and removed repeatedly.

A polishing pad is typically constructed in two layers overlying a platen with the resilient layer as the outer layer of the pad. The layers are typically made of polyurethane and may include a filler for controlling the dimensional stability of the layers. The polishing pad is usually several times the diameter of a wafer and the wafer is kept off-center on the pad to prevent polishing a non-planar surface onto the wafer. The wafer is also rotated to prevent polishing a taper into the wafer. Although the axis of rotation of the wafer and the axis of rotation of the pad are not collinear, the axes must be parallel. Polishing heads of the type described above used in the CMP process are shown in U.S. Pat. No. 4,141,180 to Gill, Jr., et al.; U.S. Pat. No. 5,205,082 to Shendon et al; and, U.S. Pat. No. 5,643,061 to Jackson, et al. It is known in the art that uniformity in wafer polishing is a function of pressure, velocity and the concentration of chemicals. Edge exclusion is caused, in part, by a non-uniform pressure applied on a wafer. The problem is reduced somewhat through the use of a retaining ring which engages the polishing pad, as shown in the Shendon et al patent.

Referring now to FIG. 1C, wherein an improved CMP head 20, sometimes referred to as a Titan® head which differs from conventional CMP heads in two major respects is shown. First, the Titan® head employs a compliant wafer carrier and second, it utilizes a mechanical linkage (not shown) to constrain tilting of the head, thereby maintaining planarity relative to a polishing pad 12, which in turn allows the head to achieve more uniform flatness of the wafer during polishing. The wafer 10 has one entire face thereof engaged by a flexible membrane 16, which biases the opposite face of the wafer 10 into face-to-face engagement with the polishing pad 12. The polishing head and/or pad 12 are moved relative to each other, in a motion to effect polishing of the wafer 10. The polishing head includes an outer retaining ring 14 surrounding the membrane 16, which also engages the polishing pad 12 and functions to hold the head in a steady, desired position during the polishing process. As shown in FIG. 1C, both the retaining ring 14 and the membrane 16 are urged downwardly toward the polishing pad 12 by a linear force indicated by the numeral 18 which is effected through a pneumatic system.

More detailed views of the Titan® head are shown in FIGS. 2A and 2B. FIG. 2A shows that in a Titan® head, two separate pressure chambers of a carrier chamber 30 and a membrane chamber 32 are used during a polish process. A carrier pressure 34 exerts on the retaining ring 14, while a membrane pressure 18 translates into wafer backside pressure. The retaining pressure is a function of both the membrane pressure and the carrier pressure, for instance, $P_{RR}=2.039\ P_{CAR}-1.908\ P_{MEM}$.

The operation of the Titan® head 20 can be shown in FIG. 2B. The Titan® head 20 picks up a wafer 10 by forming a suction cup with its membrane 16. A pressure is applied to the innertube 28 to force the membrane 16 downwardly onto the wafer 10 to ensure a good seal with the suction cup. A vacuum is thus applied to the membrane 16 to lift the wafer 10. The innertube 28 has little effect on the process because it is pressurized to the same pressure as the membrane chamber 32. During a polishing process, a pressure of approximately 5.2 psi is applied on the retaining ring which is higher than a pressure of approximately 4.5 psi that is applied on the membrane, i.e., on the wafer. The higher pressure applied on the retaining ring ensures that the wafer 10 is always retained in the retaining ring 14. However, after repeated usage, the bottom surface 36 of the retaining ring may be worn out and the wafer 10 may slide out during a polishing process. When such defective condition occurs, the wafer may be severely damaged or even broken.

FIG. 3 is a cross-sectional view of the continuation of an actual Titan® head. Within a Titan® head 20, three separate fluid chambers are utilized, i.e., a membrane chamber 38, an innertube chamber 40 and a retaining ring chamber 42. When a leakage occurs between either two of the three chambers, or between all three chambers, a "cross-talking" defect occurs which prevents either a pressure or a vacuum to reach its destination and causes a defective processing condition. For instance, when the vacuum is inadequate, the wafer may slip out and be scratched or broken. A leakage between chambers may further cause defects such as abnormal removal rate on the wafer surface or poor thickness uniformity across the entire wafer surface. It is therefore important that, before a chemical mechanical polishing process can be conducted, the three fluid chambers in the Titan® head be tested to detect any possible leakage between the chambers.

An enlarged, cross-sectional view of the membrane chamber 38, the membrane 16 and the membrane clamp 44 are shown in FIG. 4. When operating the Titan® head 20, if membrane 16 loses its elasticity, a dechuck sensor actuates to release the innertube pressure. The dechucking function therefore fails when the innertube pressure is released. When a membrane exceeds its lifetime (and therefore loses its elasticity), a serious defect of dechucking failure occurs. For instance, when the membrane exerts a −0.4 cm-Hg vacuum and the innertube exerts 1 psi pressure, the dechuck sensor should not be triggered to release the innertube pressure. However, when the membrane loses its elasticity it is no longer able to retain the required vacuum. The detection of a defective membrane, i.e., a membrane that has exceeded its lifetime, is therefore another important criterion in testing a Titan® polishing head before it is used in production.

An enlarged, cross-sectional view of the membrane 16 and the retaining ring 14, together with a carrier 46 and a retaining ring clamp screw 48 are shown in FIG. 5. When the membrane 16 is improperly mounted by the membrane clamp 44, i.e., for instance, a suitable distance or gap 50 between the membrane and the retaining ring 14 is not maintained, the membrane and the retaining ring may bind such that the membrane may be stuck with the retaining ring when exerting a downward pressure on a wafer. The binding that occurs between the membrane and the retaining ring is therefore another defect that should be detected before a Titan® head can be used in wafer processing.

In another partial, enlarged cross-sectional view of the Titan® head 20, shown in FIG. 6, an O-ring 52 and a spring 54 are incorporated in a dechucking sensor 56. When either the O-ring 52, the spring 54 or both are damaged or worn, a bad seal is resulted such that cross-talking occurs between the various fluid chambers 38, 40 and 42. It is desirable that, either the failure of the O-ring 52, the failure of the spring 54 or both should be detected to prevent a dechucking sensor failure prior to the use of a Titan® head in a CMP polishing process.

In a conventional Titan® head used for chemical mechanical polishing, it is impossible to verify the performance of the head without actually mounting the head in a CMP apparatus for a trial run. Such verification is frequently required when a rebuilt head is used, or when trouble shooting a defective head is desired. The down time of a CMP apparatus is increased as a result of the on-line testing. During such testing, wafer slipping out or broken on platen may also occur which contributes to more down-time. It is therefore desirable that if a rebuilt Titan® polishing head can be pre-tested before it is installed into a CMP apparatus for production use.

It is therefore an object of the present invention to provide a method for testing a polising head that does not have the drawbacks or shortcomings of the conventional test methods.

It is another object of the present invention to provide a method for off-line testing a polishing head for a CMP apparatus such that down time of the CMP apparatus can be avoided.

It is a further object of the present invention to provide a method for off-line testing a polishing head for a CMP apparatus by providing at least two sets of pressurizing/vacuuming/venting means capable of independently testing at least two fluid chambers in the polishing head.

It is another further object of the present invention to provide a method for off-line testing a polishing head for a CMP apparatus by providing three sets of pressurizing/vacuuming/venting means each adapted for testing a membrane chamber, an innertube chamber and a retaining ring chamber, respectively.

It is still another object of the present invention to provide a method for off-line testing a polishing head for a CMP apparatus that is capable of testing defects in the polishing head such as leakage between the fluid chambers, loss of seal in the fluid chambers and binding between the fluid chambers.

It is yet another object of the present invention to provide a method for off-line testing a polishing head for a CMP apparatus that can be used to qualify a rebuilt head prior to the installation of the rebuilt head into a CMP apparatus.

It is still another further object of the present invention to provide an off-line testing apparatus for a CMP head which includes at least two sets of pressurizing/vacuuming/venting means for testing a CMP head equipped with at least two fluid chambers.

It is yet another further object of the present invention to provide an off-line testing apparatus for a CMP head which includes three sets of pressurizing/vacuuming/venting means for testing a CMP head equipped with three fluid chambers of a membrane chamber, a retaining ring chamber and an innertube chamber.

SUMMARY OF THE INVENTION

In accordance with the present invention, a method and an apparatus for off-line testing a polishing head for a CMP apparatus are provided.

In a preferred embodiment, a method for off-line testing a polishing head can be carried out by the operating steps of first providing a polishing head that is equipped with at least two fluid chambers, providing at least two sets of pressuring/vacuuming/venting means each including a fluid source, a vacuum source, a flow regulator, a pneumatic valve, a flow gauge and a conduit for providing fluid communication between the at least two fluid chambers in the polishing head, and testing each of the at least two fluid chambers with the at least two sets of pressurizing/vacuuming/venting means for at least one defect condition selected from the group consisting of leakage between the at least two fluid chambers, loss of seal in one of the at least two fluid chambers and binding between the at least two fluid chambers.

In the method for off-line testing the polishing head, the at least two fluid chambers may include three fluid chambers of a membrane chamber, an innertube chamber and a retaining ring chamber. The polishing head may be one that is used in a chemical mechanical polishing apparatus. The method may further include the step of providing three sets of pressurizing/vacuuming/venting means each having a fluid source, a vacuum source, a flow regulator, a pneumatic valve, a flow gauge and a conduit for establishing fluid communication with the at least three fluid chambers in the polishing head. The binding defect between the at least two fluid chambers may occur between a retaining ring chamber and a membrane chamber.

In the method for off-line testing a polishing head, the polishing head may include two separate pressure chambers of a carrier chamber and a membrane chamber. The method may further include the step of controlling the testing sequence by a PLC control unit. The method may further include the step of controlling the testing sequence by a PLC control unit, electronic flow regulators and electromagnetic valves. The method may further include the step of performing a dechucking sensor defect test with the at least two sets of pressurizing/vacuuming/venting means.

In the method for off-line testing a polishing head, the method may further include the step of testing with the at least two sets of pressurizing/vacuuming/venting means an O-ring and a spring in a dechucking sensor. The method may further include the step of testing for a leakage defect between the at least two fluid chambers by first pressurizing the at least two fluid chambers to a pre-set pressure, and monitoring at least two pressure gauges for a pressure drop in the at least two fluid chambers. The method may further include the step of testing for loss of seal in the at least two fluid chambers by first withdrawing a vacuum in the at least two fluid chambers to a pre-set vacuum pressure, and monitoring at least two vacuum gauges for a pressure increase in the at least two fluid chambers.

The present invention is further directed to an off-line testing apparatus for a chemical mechanical polishing head which includes at least two sets of pressurizing/vacuuming/venting means for testing a CMP head equipped with at least two fluid chambers, wherein each of the at least two sets of pressurizing/vacuuming/venting means further includes a fluid source, a vacuum source, a flow regulator, a pneumatic valve, a flow gauge and a conduit for providing fluid communication between the at least two fluid chambers in the CMP head.

In the off-line testing apparatus for a chemical mechanical polishing head, the apparatus is used in testing a leakage defect between the at least two fluid chambers, or in testing a loss of seal defect in the at least two fluid chambers, or in testing a binding defect between the at least two fluid chambers, i.e., between a retaining ring chamber and a membrane chamber. The at least two fluid chambers may include three fluid chambers of a membrane chamber, an innertube chamber and a retaining ring chamber. The apparatus may further include three sets of pressurizing/vacuuming/venting devices for testing three fluid chambers. The at least two sets of pressurizing/vacuuming/venting devices are independent of each other. The apparatus may further include a PLC control unit for controlling a test sequence; or a PLC control unit, electronic flow regulators and electromagnetic valves for controlling a test sequence.

BRIEF DESCRIPTION OF THE DRAWINGS

These and other objects, features and advantages of the present invention will become apparent from the following detailed description and the appended drawings in which:

FIG. 5 is a partial, enlarged cross-sectional view of the Titan® head illustrating the membrane chamber and the retaining ring chamber positioned juxtaposed to each other.

FIG. 6 is a partial, enlarged cross-sectional view of the Titan® head illustrating an O-ring and a spring used in a dechucking sensor.

DETAILED DESCRIPTION OF THE PREFERRED AND ALTERNATE EMBODIMENTS

The present invention discloses a method for off-line testing a polishing head used in a CMP apparatus by providing at least two sets of pressurizing/vacuuming/venting devices that operates independently from each other for testing at least two fluid chambers for defect conditions such as leakage between the two fluid chambers, loss of seal in the two fluid chambers and binding between the two fluid chambers. Each of the two sets of pressurizing/vacuuming/venting devices may include a gas source such as $N_2$, a vacuum source, a flow regulator, a pneumatic valve, a flow gauge and a conduit connecting between the at least two fluid chambers in the polishing head. The at least two fluid chambers may include three fluid chambers such as a membrane chamber, an innertube chamber and a retaining ring chamber used in a CMP polishing head. The binding defect normally occurs between two fluid chambers of a retaining ring chamber and a membrane chamber.

The method may either be carried out manually by operating the valves, or be carried out automatically by utilizing a PLC unit. When the automated method of PLC unit is utilized, other electronic flow regulators and electromagnetic valves must also be used. The present invention novel method is effective in detecting a defective O-ring or a defective spring in a dechucking sensor before a rebuilt CMP head is installed into a CMP apparatus. A leakage defect in the fluid chambers may be detected by first pressurizing a fluid chamber to a pre-set pressure, and then monitoring a pressure change in the fluid chamber by a pressure gauge until a pressure drop has occurred in the chamber. The present invention method is also effective in testing a loss of seal defect in the fluid chambers by first withdrawing a vacuum in the fluid chamber to a pre-set vacuum pressure, and then monitoring a vacuum gauge for a pressure increase in the fluid chamber.

According to the present invention, an off-line testing apparatus for a CMP head is further provided. The apparatus includes at least two sets of pressurizing/vacuuming/venting means for testing a CMP head that is equipped with at least two fluid chambers. Each of the at least two sets of pressurizing/vacuuming/venting devices may further include a fluid source such as a general $N_2$ source, a vacuum source, a flow regulator, a pneumatic valve, a flow gauge and a conduit for providing fluid communication between the at least two fluid chambers in the CMP head. The apparatus may be advantageously used in testing a variety of defects in the CMP head prior to installing the head in a CMP apparatus for a production run. For instance, the defects may include a leakage defect between the at least two fluid chambers, a loss of seal defect in the at least two fluid chambers, and a binding defect between a retaining ring chamber and a membrane chamber. The at least two sets of pressurizing/vacuuming/venting devices can be operated independent of each other.

Figure 1A:
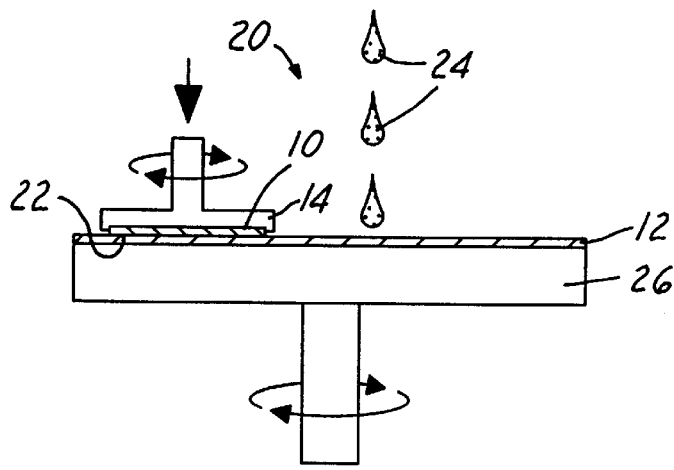
FIG. 1A is an illustration of a side view of a typical conventional chemical mechanical polishing apparatus.
Figure 1B:
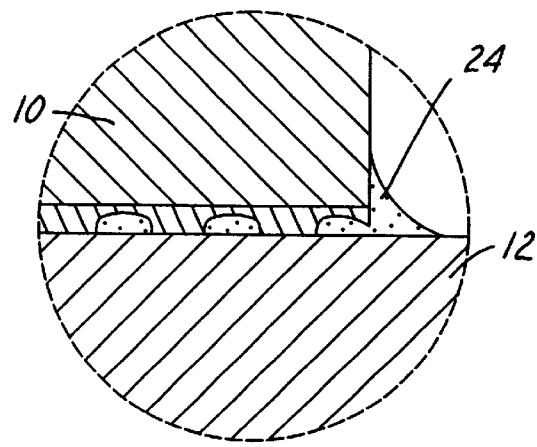
FIG. 1B is a partial, enlarged cross-sectional view of a wafer surface situated on a polishing pad.
Figure 1C:
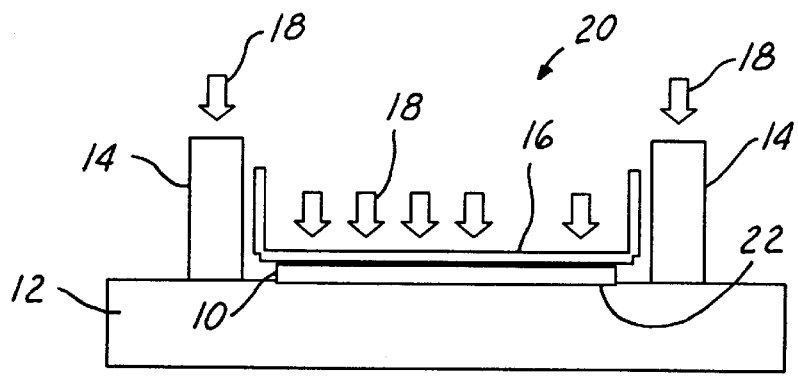
FIG. 1C is a cross-sectional view of an improved polishing head, or the Titan® polishing head.
Figure 2A:
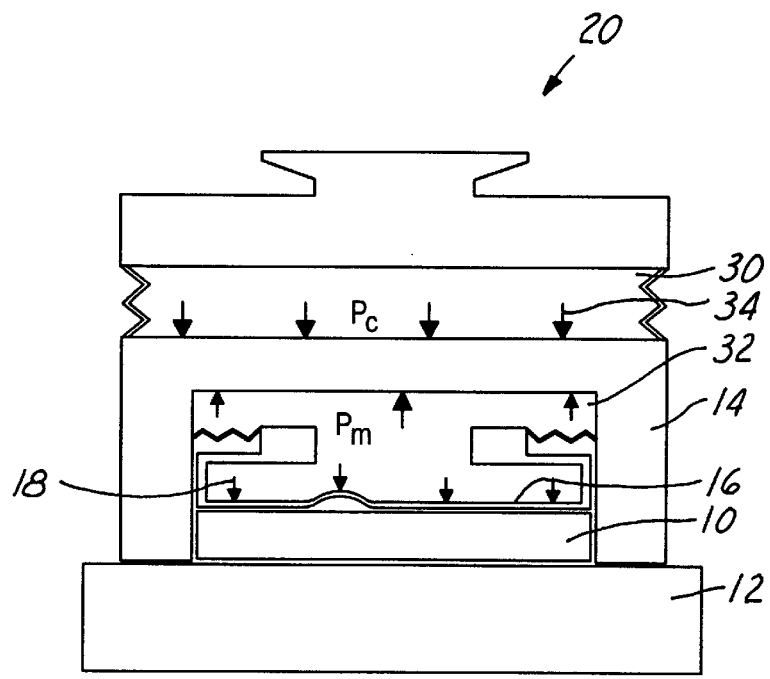
FIG. 2A is a cross-sectional view of the Titan® head illustrating two pressure chambers of a carrier chamber and a membrane chamber.
Figure 2B:
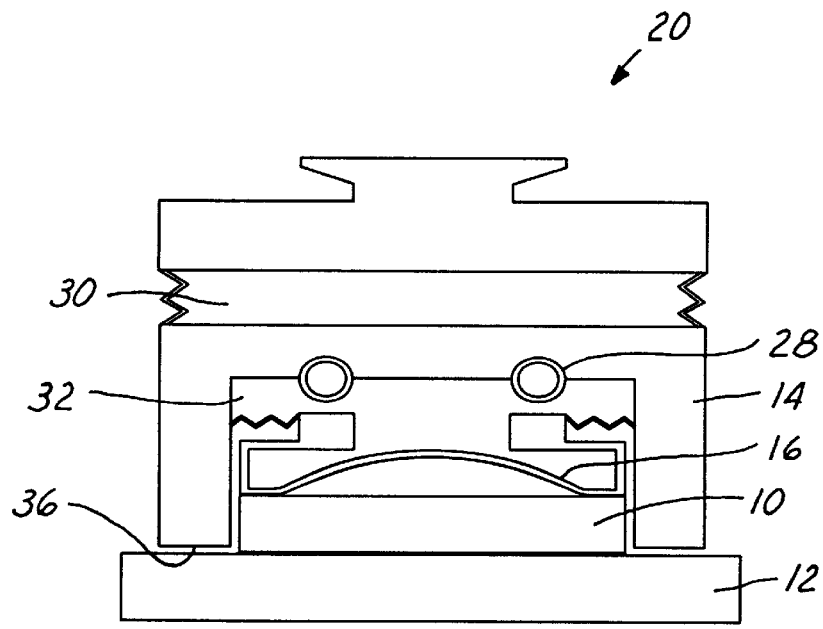
FIG. 2B is a cross-sectional view of a Titan® head illustrating three fluid chambers of an innertube chamber, a membrane chamber and a retaining ring chamber.
Figure 3:
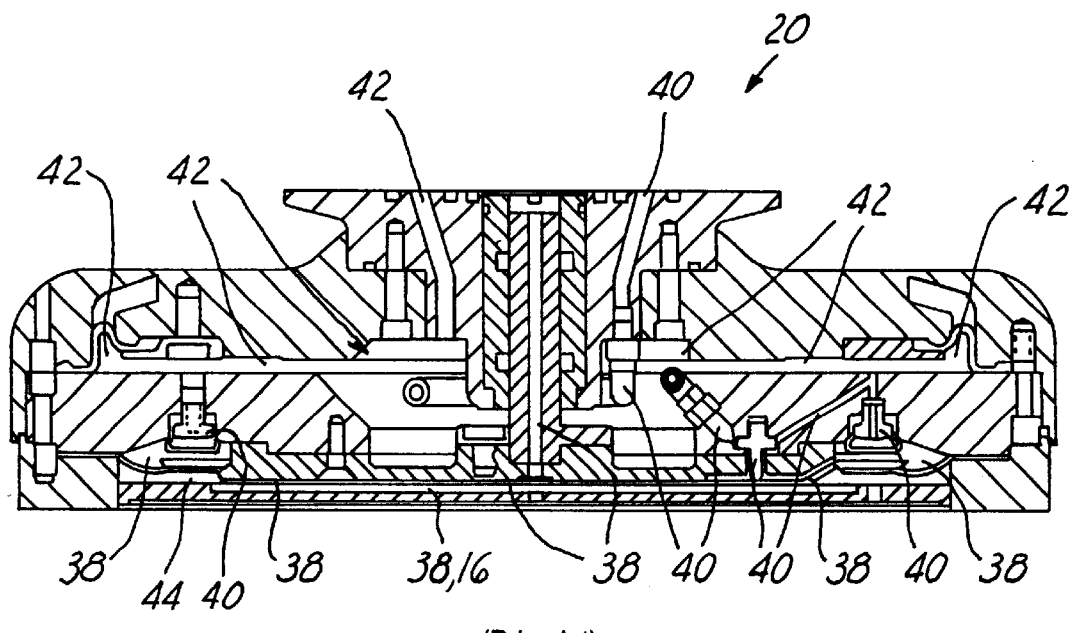
FIG. 3 is a cross-sectional view of a Titan® head showing the construction of the three fluid chambers.
Figure 4:
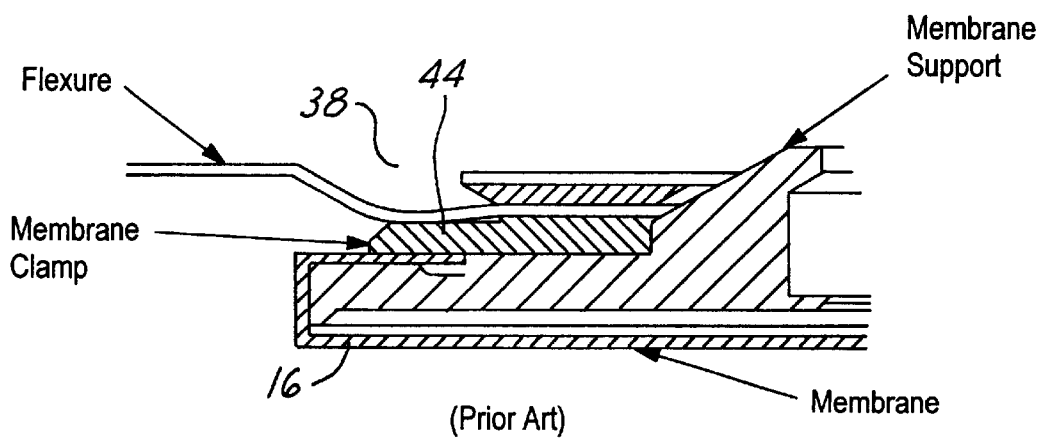
FIG. 4 is an enlarged, partial cross-sectional view of the Titan® head illustrating the membrane and the membrane clamp.
Figure 7:
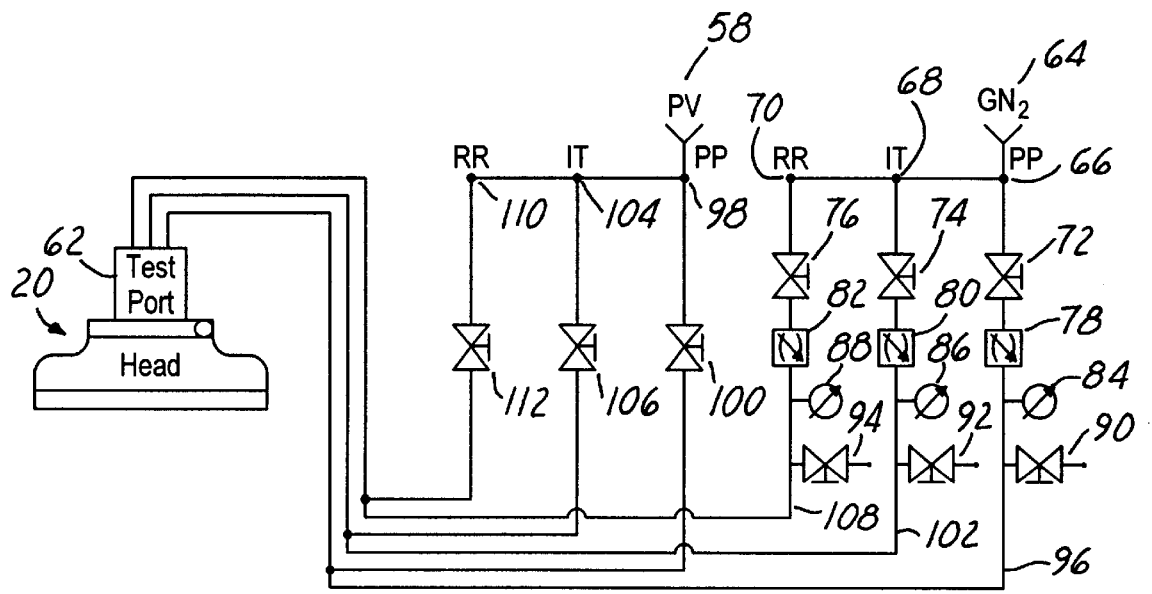
FIG. 7 is an illustration of the present invention novel apparatus for off-line testing of a CMP polishing head.

Referring now to FIG. 7, wherein an illustration of the present invention novel apparatus 60 is shown. In the apparatus 60, three independent sets of pressurizing/vacuuming/venting devices are provided to a Titan® polishing head 20 through a test port 62. For instance, a factory general nitrogen source 64 may be fed into the three sets of devices, i.e., for the membrane chamber through an inlet 66, for the innertube chamber through an inlet 68 and for the retaining ring chamber through an inlet 70. Each of the inlets 66, 68 and 70 leads to a pneumatic valve 72, 74 and 76, a flow regulator 78, 80 and 82, a flow gauge 84, 86 and 88, and a vent valve 90, 92 and 94, respectively for venting to the atmosphere. In the pressurizing/venting passageway 96 for the membrane chamber, a factory vacuum is fed from inlet 98 through a pneumatic control valve 100. Similarly, a pressurizing/venting passageway 102 for the innertube chamber is also fed a vacuum line from inlet 104 through pneumatic valve 106. Furthermore, a pressurizing/venting passageway 108 to the retaining ring chamber is fed with a vacuum from inlet 110 through a pneumatic control valve 112. All the passageways 96, 102 and 108 are fed into the test port 62 for fluid communication with the respective fluid chambers in the polishing head 20. The present invention novel apparatus can therefore be operated independently from each other. By the novel independent operation, it is possible to detect leakages in each individual fluid chamber, or in-between the individual fluid chambers. The independent vacuum lines fed to the respective fluid chambers further allow a loss of seal defect to be detected.

By utilizing the present invention novel apparatus shown in FIG. 7, various defects in a rebuilt polishing head can be detected without actually mounting the head in a CMP apparatus for testing. For instance, defects such as cross-talking between the fluid chambers, a defective membrane after passing its lifetime, a binding effect between a membrane chamber and a retaining ring chamber and defective parts which disable a dechucking sensor. By utilizing the present invention stand-alone off-line apparatus, the down time of a CMP apparatus can be avoided since there is no need to test the head in a CMP apparatus.

Figure 8:
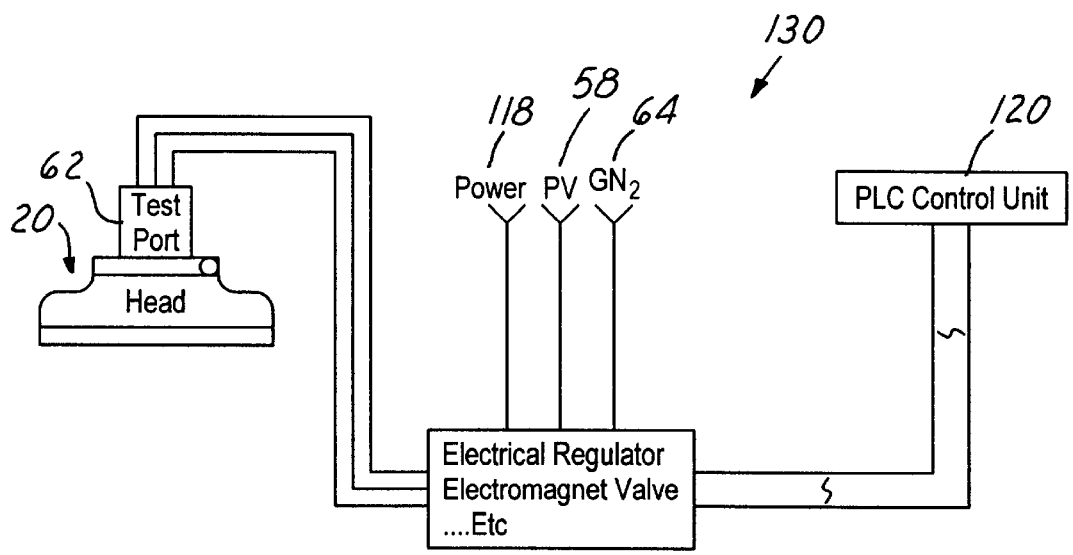
FIG. 8 is an illustration of the present invention apparatus in an alternate embodiment for the automated off-line testing of a polishing head utilizing a PLC unit.

The present invention novel apparatus can further be operated in an automated mode as shown in FIG. 8. A PLC unit 120 is utilized in the automated testing apparatus 130. A general nitrogen source 64, a factory vacuum 58 and a power source 118 are fed into a control center which utilizes electronic regulators and electromagnetic valves for performing various control functions in testing the polishing head 20. In this automated mode, there is no need to manually operate the various flow meters and pneumatic valves. It is therefore a more desirable mode of operation for carrying out the present invention novel test method.

The present invention novel apparatus and method have therefore been amply demonstrated in the above descriptions and in the appended drawings of FIGS. 7 and 8.

While the present invention has been described in an illustrative manner, it should be understood that the terminology used is intended to be in a nature of words of description rather than of limitation.

Furthermore, while the present invention has been described in terms of a preferred and alternate embodiment, it is to be appreciated that those skilled in the art will readily apply these teachings to other possible variations of the inventions.

The embodiment of the invention in which an exclusive property or privilege is claimed are defined as follows:

1. A method for off-line testing a polishing head comprising the steps of:
   providing a polishing head equipped with at least two fluid chambers,
   providing at least two sets of pressurizing/vacuuming/venting means each comprises a fluid source, a vacuum source, a flow regulator, a pneumatic valve, a flow gauge and a conduit for providing fluid communication between said at least two fluid chambers in said polishing head, and
   testing each of said at least two fluid chambers with said at least two sets of pressurizing/vacuuming/venting means for at least one defect selected from the group consisting of leakage between said at least two fluid chambers, loss of seal in one of said at least two fluid chambers, and binding between said at least two fluid chambers.

2. A method for off-line testing a polishing head according to claim 1, wherein said at least two fluid chambers comprises three fluid chambers of a membrane chamber, an innertube chamber and a retaining ring chamber.

3. A method for off-line testing a polishing head according to claim 1, wherein said polishing head is used in a chemical mechanical polishing (CMP) apparatus.

4. A method for off-line testing a polishing head according to claim 1 further comprising the steps of providing three sets of pressurizing/vacuuming/venting means each comprises a fluid source, a vacuum source, a flow regulator, a pneumatic valve, a flow gauge and a conduit for establishing fluid communication with the at least three fluid chambers in said polishing head.

5. A method for off-line testing a polishing head according to claim 1, wherein said binding defect between said at least two fluid chambers occurs between a retaining ring chamber and a membrane chamber.

6. A method for off-line testing a polishing head according to claim 1, wherein said polishing head comprises two separate pressure chambers of a carrier chamber and a membrane chamber.

7. A method for off-line testing a polishing head according to claim 1 further comprising the step of controlling said testing sequence by a PLC unit.

8. A method for off-line testing a polishing head according to claim 1 further comprising the step of controlling said testing sequence by a PLC unit, electronic flow regulators and electromagnetic valves.

9. A method for off-line testing a polishing head according to claim 1 further comprising the step of performing a dechucking sensor defect test with said at least two sets of pressurizing/vacuuming/venting means.

10. A method for off-line testing a polishing head according to claim 1 further comprising the step of testing with said at least two sets of pressurizing/vacuuming/evening means an O-ring and a spring in a dechucking sensor.

11. A method for off-line testing a polishing head according to claim 1 further comprising the step of testing for leakage defect between said at least two fluid chambers by:
   pressurizing said at least two fluid chambers to a pre-set pressure, and monitoring at least two pressure gauges for a pressure drop in said at least two fluid chambers.

12. A method for off-line testing a polishing head according to claim 1 further comprising the step of testing for loss of seal defect in said at least two fluid chambers by:

withdrawing a vacuum in said at least two fluid chambers to a pre-set vacuum pressure, and monitoring at least two vacuum gauges for a pressure rise in said at least two fluid chambers.

13. An off-line testing apparatus for a chemical mechanical polishing (CMP) head comprising:

three sets of pressurizing/vacuuming/venting means for testing a CMP head equipped with a membrane chamber, an inner tube chamber and a retaining ring chamber, and each of said three sets of pressurizing/vacuuming/venting means further comprises a fluid source, a vacuum source, a flow regulator, a pneumatic valve, a flow gauge and a conduit for providing fluid communication with said three fluid chambers in said CMP head.

14. An off-line testing apparatus for a chemical mechanical polishing (CMP) head according to claim 13, wherein said apparatus is used in testing a leakage defect between said three fluid chambers.

15. An off-line testing apparatus for a chemical mechanical polishing (CMP) head according to claim 13, wherein said apparatus is used in testing a loss of seal defect in said three fluid chambers.

16. An off-line testing apparatus for a chemical mechanical polishing (CMP) head according to claim 13, wherein said apparatus is used in testing a binding defect between said three fluid chambers.

17. An off-line testing apparatus for a chemical mechanical polishing (CMP) head according to claim 13, wherein said apparatus is used in testing a binding effect between a retaining ring chamber and a membrane chamber.

18. An off-line testing apparatus for a chemical mechanical polishing (CMP) head according to claim 13, wherein said three sets of pressurizing/vacuuming/venting means are independent of each other.

19. An off-line testing apparatus for a chemical mechanical polishing (CMP) head according to claim 13 further comprising a PLC unit for controlling a test sequence.

20. An off-line testing apparatus for a chemical mechanical polishing (CMP) head according to claim 13 further comprising a PLC unit, electronic flow regulators and electromagnetic valves for controlling a test sequence.

* * * * *